United States Patent
Shao et al.

(10) Patent No.: US 9,846,625 B2
(45) Date of Patent: Dec. 19, 2017

(54) METHOD AND DEVICE FOR DEBUGGING A MIPS-STRUCTURE CPU WITH SOUTHBRIDGE AND NORTHBRIDGE CHIPSETS

(75) Inventors: Zongyou Shao, Tianjin (CN); Xinchun Liu, Tianjin (CN); Xiaojun Yang, Tianjin (CN); Chenming Zheng, Tianjin (CN); Ying Wang, Tianjin (CN); Hui Wang, Tianjin (CN); Shengjie Liu, Tianjin (CN); Zhibin Hao, Tianjin (CN); Faqing Liang, Tianjin (CN); Wenhao Yao, Tianjin (CN)

(73) Assignee: DAWNING INFORMATION INDUSTRY CO., LTD., Tianjin (CN)

( * ) Notice: Subject to any disclaimer, the term of this patent is extended or adjusted under 35 U.S.C. 154(b) by 1045 days.

(21) Appl. No.: 13/806,784

(22) PCT Filed: May 20, 2011

(86) PCT No.: PCT/CN2011/000875
§ 371 (c)(1),
(2), (4) Date: Feb. 17, 2014

(87) PCT Pub. No.: WO2012/155300
PCT Pub. Date: Nov. 22, 2012

(65) Prior Publication Data
US 2014/0157051 A1    Jun. 5, 2014

(30) Foreign Application Priority Data
May 16, 2011    (CN) .......................... 2011 1 0126228

(51) Int. Cl.
*G06F 11/22*    (2006.01)
*G06F 11/36*    (2006.01)

(52) U.S. Cl.
CPC ........ *G06F 11/2236* (2013.01); *G06F 11/221* (2013.01); *G06F 11/3648* (2013.01)

(58) Field of Classification Search
CPC .......................... G06F 11/2236; G06F 11/221
See application file for complete search history.

(56) References Cited

U.S. PATENT DOCUMENTS 7,257,654 B1 * 8/2007 Reeves .......... G01R 31/318555
326/38
7,296,185 B2 * 11/2007 Huang .................. G06F 11/362
714/30

(Continued)

*Primary Examiner* — Yolanda L Wilson
(74) *Attorney, Agent, or Firm* — Platinum Intellectual Property LLP

(57) ABSTRACT

The present invention discloses a method and a device to debug the Loongson CPU (a MIPS-structure CPU) and bridge chips. The device, including HT bus interfaces and the corresponding switches, connects the Loongson CPU and bridge chips through HT bus interfaces. Southbridge chips and northbridge chips with HT buses are selected in the following order: introducing the pins on the Loongson CPU and bridge chips into the debug device; debugging the pins on the Loongson CPU to identify whether there are any bugs with the pins; connecting the pins from the CPU and bridge chips to debug them. If the HT bus of the Loongson CPU fails to accord with the standard protocol, the problematic signal can be identified and further adjusted to improve the CPU. With the help of FPGA, multiple HT bus interfaces can be simulated. As a result, multiple chipsets can be linked to the Loongson CPU, which may be debugged simultaneously.

17 Claims, 3 Drawing Sheets

(56) References Cited

U.S. PATENT DOCUMENTS

| | | | | |
|---|---|---|---|---|
| 2002/0178320 A1* | 11/2002 | Wu | ............ | G06F 13/4027 |
| | | | | 710/306 |
| 2005/0010709 A1* | 1/2005 | Davies | ............ | G06F 11/1456 |
| | | | | 710/305 |
| 2005/0102549 A1* | 5/2005 | Davies | ............ | G06F 11/201 |
| | | | | 714/4.1 |
| 2006/0026468 A1* | 2/2006 | Greener | ............ | G06F 11/221 |
| | | | | 714/45 |
| 2006/0059286 A1* | 3/2006 | Bertone | ............ | G06F 9/30014 |
| | | | | 710/260 |
| 2006/0149958 A1* | 7/2006 | Omathuna | ............ | G06F 9/445 |
| | | | | 713/2 |
| 2007/0294055 A1* | 12/2007 | Wang | ............ | G06F 11/221 |
| | | | | 702/186 |
| 2008/0005378 A1* | 1/2008 | Alexander | ............ | G06F 13/405 |
| | | | | 710/15 |
| 2008/0052576 A1* | 2/2008 | Brandyberry | ............ | G06F 11/2242 |
| | | | | 714/727 |
| 2010/0332927 A1* | 12/2010 | Kurts | ............ | G06F 11/2236 |
| | | | | 714/724 |
| 2012/0124424 A1* | 5/2012 | Gorti | ............ | G06F 11/27 |
| | | | | 714/27 |
| 2012/0150474 A1* | 6/2012 | Rentschler | ............ | G01R 31/31705 |
| | | | | 702/117 |

* cited by examiner

2  Signaling

The HyperTransport™ signals listed in Table 1 constitute a single unidirectional connection between two nodes. A full link requires a connection in each direction. However, the connections need not be the same width in each direction.

Table 1.  Link Signals

| Signal | Width | Description |
|---|---|---|
| CAD | 2, 4, 8, 16, or 32 | Command, Addresses, and Data (CAD). Carries HyperTransport™ requests, responses, addresses and data. CAD width can be different in each direction. |
| CTL | 1, 2, or 4 | Differentiates control and data. Each byte of CAD has a CTL signal in Gen3 protocol. One CTL signal is used for an entire link in Gen1 protocol. |
| CLK | 1, 2, or 4 | Clocks for the CAD and CTL signals. Each byte of CAD and its respective CTL signal has a separate clock signal. |

HyperTransport links wider than 8 bits are built by ganging multiple 8-bit links in parallel to form either 16- or 32-bit links.

In addition to the link signals, all HyperTransport devices require the reset/initialization input pins listed in Table 2.

Table 2.  Reset/Initialization Signals

| Signal | Width | Description |
|---|---|---|
| PWROK | 1 | Power and clocks are stable. |
| RESET# | 1 | Reset the HyperTransport™ chain. |

Table 3.  Power Management Signals

| Signal | Width | Description |
|---|---|---|
| LDTSTP# | 1 | Enables and disables links during system state transitions. |
| LDTREQ# | 1 | Indicates link is active or requested by a device. |

Fig. 3

METHOD AND DEVICE FOR DEBUGGING A MIPS-STRUCTURE CPU WITH SOUTHBRIDGE AND NORTHBRIDGE CHIPSETS

CLAIM OF PRIORITY

This present application claims the benefit of priority to PCT Application No. PCT/CN2011/000875, filed May 20 2011, all of which application are incorporated herein by reference in their entirety.

TECHNICAL FIELD

This present invention discloses the design of the Loongson CPU motherboard, a MIPS-structure CPU motherboard. More particularly, it discloses a method and a device to debug the Loongson CPU, northbridge chip and southbridge chip.

BACKGROUND OF INVENTION

Loongson-3 series CPUs include 4-core 3A, 8-core 3B, 16-core 3C as well as other series CPUs later developed.

Loongson-3 is a general-purpose multi-core CPU with MIPS (Microprocessor without Interlocked Pipeline Stages) architecture, functioning similar to Intel or AMD (Advanced Micro Devices) X86 architectures while enjoying unique advantages in energy conservation and safety. Although Loongson-3 CPU slightly lags behind the X86 CPU in performance, it can be a replacement to the X86 CPU in most cases.

Although Loongson-3A and Loongson-3B CPUs have been made public, the critical issue regarding how the Loongson CPU can work most efficiently (i.e. to find north and south bridge chipsets and peripherals which could match with the Loongson CPU and function well) remains unresolved prior to the present invention.

Even though a type of chipsets can be selected to match the Loongson CPU in debugging, at a debugging failure, it is difficult to identify whether the bugs come from the Loongson CPU or the incompatibility between the CPU and the chipsets. If the former is the cause, the bugs of the CPU can be modified without abandoning the selected chipsets; if the later is the cause, a new type of chipsets need to be selected. However, the current debug method based on wild speculation and spontaneous experiments can hardly identify the real cause. Therefore, it's imperative to find a flexible debug method that can accurately identify the source of the failure in debugging.

When bugs are found in the Loongson CPU, especially on the Hyper Transport (HT) bus (as shown in FIG. 1) in current debug method, the only solution available is to modify the design of the Loongson CPU, and the debug can not resume until the Loongson CPU with a modified design is welded. On the other hand, power up/down sequences and the configuration of signal lines between the Loongson CPU and chipsets can't be determined until the adaptive chipsets are found.

As shown in FIG. 1, according to the current debug method, a type of chipsets matches with a type of motherboard. It usually takes at least two months to design and manufacture a motherboard. If adding the debug time, it takes at least six months to test a selected motherboard, which is long and costly. In addition, because the current debug method cannot debug different types of chipsets on one motherboard simultaneously, it requires different types of motherboards.

FPGA (Field Programmable Gate Array) is used in flexible field programming. FPGA may also repeatedly modify the code, simulate common 10 interfaces (for example, HT bus, PCIE bus and SerDes), flexibly change clock frequencies and adjust the signal level as well as on-line signal detection.

BRIEF DESCRIPTION OF THE DRAWINGS

FIG. 3 is the connectivity of the Loongson CPU and AMD Chip Reset and Power Management signals

SUMMARY OF THE INVENTION

Figure 1:
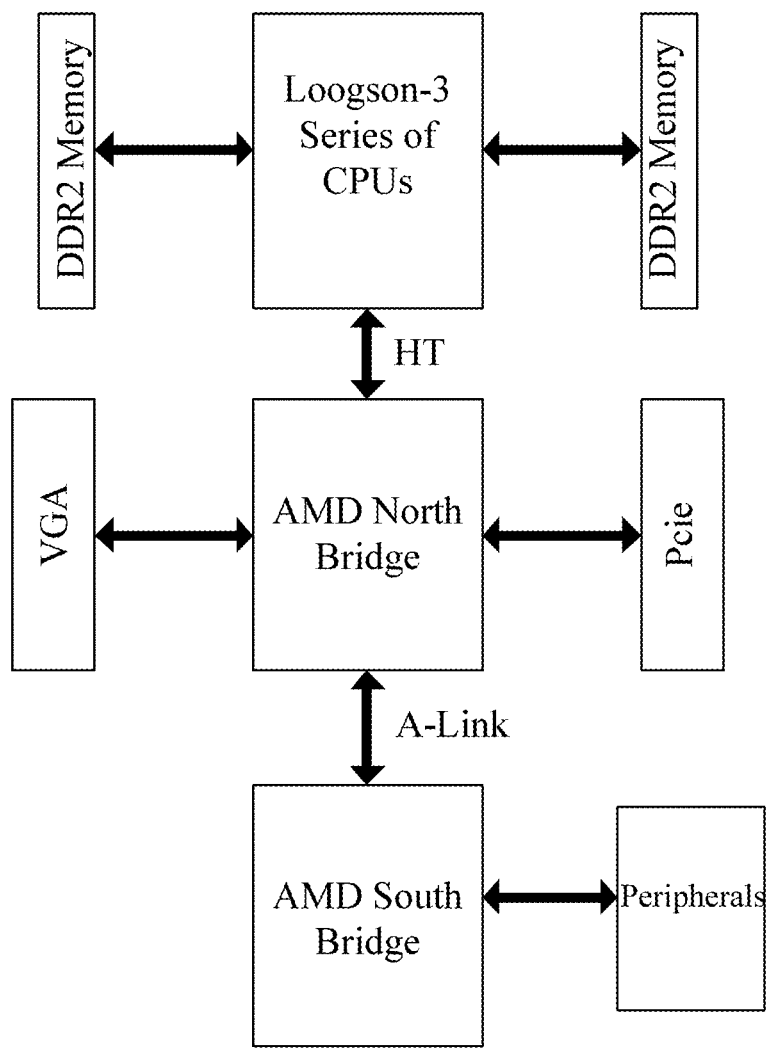
FIG. 1 is the Motherboard Architecture of the Loongson CPU

This invention discloses a method and a device to debug the Loongson CPU to work with northbridge chip and southbridge chips. According to this invention, even if there are bugs with the HT bus of the Loongson CPU, they can be repaired or shielded to continue debugging or testing bridge chips' compatibility and other functions.

The method to debug the Loongson CPU and bridge chips, comprising:

choosing the northbridge chip and the southbridge chip which supports the HT bus;

introducing the pins on the Loongson CPU, the northbridge chip and southbridge chip to the debug device;

debugging the pins on the Loongson CPU to identify if there are any bugs; and connecting the corresponding pins on the Loongson CPU with the pins on the northbridge/southbridge and debugging them.

In one embodiment, the debug device is used to inspect if pin signals on the Loongson CPU meet the requirements in User's Manual.

In another embodiment, if there are bugs on the pin signals of the Loongson CPU, the problematic signals can be amended into standard signals with the debug device;

In yet another embodiment, the adjustment of problematic pin signals into standard signals is achieved through programming in the debug device;

In one embodiment, it is preferred to code the aforementioned program in verilog language.

In another embodiment, the debug device includes HT bus interfaces.

Yet in another embodiment, the debug device connects the Loongson CPU and the northbridge chip through a HT bus interface.

In one embodiment, the debug device is linked to the southbridge chip through the HT control line.

In one embodiment, after the engagement, debug the HT bus to check whether it is successfully connected. If the HT bus is successfully connected, continue to debug other pins. If the HT bus is not connected, try another southbridge chip or northbridge chip.

In another embodiment, the Loongson CPU adopts an operating mode of a 16-bit HT bus.

In one embodiment, in the operation of the Loongson CPU with the adaptive southbridge chip, the Loongson CPU is connected to the HT control lines on the southbridge chip through the low 8-bit HT control lines.

In another embodiment, in the operation of the Loongson CPU with the adaptive northbridge chip, the Loongson CPU works in slave mode.

In one embodiment, pins which are not clearly defined or fail to match with any placements are introduced into the FPGA chip to debug and will be shielded or linked after the debugging.

In one embodiment, the debug device for debugging the Loongson CPU and bridge chips comprises the FPGA chip, HT bus interfaces and HT bus interface switches. The debug device is linked to the HT bus on the Loongson CPU and the HT bus on the northbridge chip through HT bus interfaces. HT control lines, the power up/down timing signal lines, and other important signals on the southbridge or northbridge chipsets are linked to the debug device.

In another embodiment, the pins on the Loongson CPU and on the northbridge are directly introduced into FPGA chip.

Yet in another embodiment, the debug device can reshape the signals when HT bus signals of the Loongson CPU indicate failure.

In one embodiment, the aforementioned signal reshaping is achieved through programming in verilog language on the FPGA chip.

In another embodiment, in debugging, only HT buses related to the Loongson CPU and the chipsets to be debugged are turned on, while the other HT buses on northbridge/southbridge chipsets are shut off.

In one embodiment, if the debugging of the southbridge or the northbridge fails, switch on the HT bus on the next southbridge or the next northbridge.

In another embodiment, the debug device usually includes five HT interfaces, one for linking the Loongson CPU and four for linking four northbridge chips.

According to one embodiment of the present invention, if the HT bus on the Loongson CPU disaccords with the requirements as outlined in the standard protocol, the problematic signal can be identified and repaired accordingly. Despite these bugs in the Loongson CPU, once being identified, the bugs can be shielded by FPGA without interrupting the debugging, which is flexible in time and cost.

If the important, yet undefined signal lines or the signal lines cause unknown failures, the performance of these signal lines can be flexibly adjusted to meet the design requirements rather than change the design. With the help of FPGA, multiple HT bus interfaces can be simulated, as a result, multiple chipsets can be linked to the Loongson CPU and multiple chipsets on the motherboard can be debugged simultaneously. When debugging the Loongson CPU with one chipsets, disconnecting other chipsets with the Loongson CPU may save time and cost.

According to one embodiment of the present invention, northbridge chips which may match with Loongson CPU include RS780, RS780C, RS780D, RS780E, RS780G, RS780M, RS780MC, RX781, RS785G, RD790, SR5690, SR5670 and SR5650; southbridge chips which may match with the Loongson CPU include SB700, SB710, SB750, SB600, SP5100, SP5100R, and SP5100RS.

DETAILED DESCRIPTION OF THE PREFERRED EMBODIMENTS

The present invention employs FPGA to program and simulate multiple HT bus interfaces. Undefined or unknown signal lines of these chips are linked into FPGA. Thus, the method and device disclosed in this invention may be used to debug multiple chipsets on one motherboard simultaneously. This invention may employ the debug device with five HT interfaces, i.e. the debug device may debug four southbridge/northbridge chipsets at the same time. Among the five HT interfaces, one is used to connect the Loongson CPU and the other four are used to connect northbridge chips. Southbridge is linked to the debug device through HT and other control lines. If one bridge chip cannot be connected, try the next one by switching on the next bridge chip.

As shown in FIG. 3, the standard HT bus protocol covers three types of signal lines: link signal lines (for data, address, control and clock), reset and initialization signal lines and power management signal lines.

To connect signal lines, there is a one-to-one correspondence between the Loongson CPU and the northbridge chip, which includes sixteen receiving differential pairs, sixteen transmitting differential pairs, two receiving clock differential pairs, two transmitting clock differential pairs, two receiving control differential pairs, and two transmitting control differential pairs.

The HT bus on the selected northbridge corresponds with the standard HT bus protocol, but some extra special signals on the Loongson CPU HT bus are generated due to the unique design of the Loongson CPU. It is critical to process these special signals in the physical layers and protocol layers without impacting the operation of Loongson CPU and the compatibility between Loongson CPU and chipsets. In the standard HT bus protocol, there is only one group of PWROK, RESET#, LDTSTOP# and LDTREQ#. However, in the Loongson HT bus, there are two groups of HT_HI_POWEROK, HT_HI_RSTn, HT_HI_LDT_STOPn, HT_HI_LDT_REQn, HT_LO_POWEROK, HT_LO_RSTn, HT_LO_LDT_STOPn and HT_LO_LDT_REQn. These signals are special because of the unique design of the Loongson CPU.

The Loongson CPU HT bus has 16 bits width, and it is uniquely designed so that the 16-bit bus can be divided into two separate 8-bit-wide HT bus with either of which can be linked to other CPUs or bridges. The signal HT_8×2 determines whether the Loongson CPU HT shall be used as a 16-bit-wide bus or two separate 8-bit-wide buses. HT_HI_HOSTMODE, HT_HI_RSTn, HT_HI_POWEROK, HT_HI_LDT_REQn and HT_HI_LDT_STOPn are signals from the high 8-bit HT bus and HT_LO_HOSTMODE, HT_LO_RSTn, HT_LO_POWEROK, HT_LO_LDT_REQn and HT_LO_LDT STOPn are signals from the low 8-bit HT bus. Prior to this invention, there are no standards to follow in the handling of these signals and how to be connected to the bridge chips. According to the present invention, these signal lines are introduced into FPGA.

If there are important and undefined signal lines on the Loongson CPU and bridge chips, these signal lines need to be introduced into FPGA as well. These signal lines can be categorized into power up/down timing and configuration signal lines. These signal lines include 1) SYSRESETN (system reset signal lines of the Loongson CPU) and PCI_RESETN (PCI bus reset signal lines); 2) PWR_GOOD (signal lines indicating the completion of power-on of the southbridge chip) and NB_PWRGD (signal lines indicating the of power-on of the northbridge chip); 3) EN (enable signals on each power supply module) and PWRGOOD (power OK signals); 4) GPIO (configuration signal lines of the Loongson CPU), signal lines to set he memory clock frequency and signal lines to set the HT bus clock frequency.

Challenges in power up/down timing and sequence include: first, the Loongson CPU has not been tested for its practicability after being made public, so the power up/down timing and sequence of the CPU have to be tested and verified; second, since the bridge chipsets to match Loongson CPU Loongson has yet to be found, it remains an issue regarding how the Loongson CPU matches up the power up/down timing and sequence of bridge chipsets. According to the present invention, signals to control the power supply module, the power up/down timing and sequence of bridge chipsets are linked into FPGA, which allows flexible adjustment of these signals until it meets the need.

Below is a list of examples:

Link the HT bus (40 differential pairs noted above) of the Loongson CPU into FPGA; link the HT buses of northbridge/southbridge chipsets produced by different companies into FPGA.

Link the special signal lines of HT bus of the Loongson CPU into FPGA, wherein these special signal lines are respectively HT_8×2, HT_HI_HOSTMODE, HT_HI_RSTn, HT_HI_POWEROK, HT_HI_LDT_REQn, HT_HI_LDT_STOPn, HT_LO_HOSTMODE, HT_LO_RSTn, HT_LO_POWEROK, HT_LO_LDT_REQn and HT_LO_LDT_STOPn.

Link the reset and initialization signal lines of HT buses of northbridge/southbridge chipsets into FPGA, wherein the signal lines are respectively LDT STP#, LDT RST#, LDT_PG and ALLOW_LDTSTP.

Link power up/down timing and sequence signal lines into FPGA, wherein these signal lines include: a) SYSRESETN, the signal lines for the reset of the Loongson CPU system and PCI_RESETN, the signal lines for the reset of PCI bus; b) PWR_GOOD, the signal lines indicating the completion of power-on of the southbridge chip and NB_PWRGD, the signal lines indicating power-on of the northbridge; c) EN, the power-on enable signal of each power supply module and PWRGOOD, the power OK signal;

Introduce the configuration signal lines into FPGA wherein the signal lines include GPIOs to configure Loongson CPU, the signal lines to set the memory clock frequency, and the signal lines to set the HT bus clock frequency.

Receive and analyze the signals from the Loongson CPU HT bus, and examine if the Loongson CPU HT bus corresponds effectively according to the standard HT bus protocol. If substantial bugs are found in the Loongson CPU HT bus, a program can be simulated in FPGA to change the problematic HT bus into a standard HT bus through filtration and re-shaping to connect the Loongson CPU with bridge chips.

In debugging, only operate one HT bus to enable one group of southbridge and northbridge to link with the Loongson CPU, while the other HT buses are shut off.

Debug the special signals from the Loongson CPU HT bus through FPGA, and identify an effective method to connect or disconnect the signal lines for the reset, initialization and power management of the HT bus on the southbridge or northbridge.

Through FPGA, turn on or off each power module for the Loongson CPU and chipsets by changing the status of the EN signals and PWR_GOOD signals, and adjust their order and time intervals to achieve the right power up/down sequences.

Through FPGA, deploy some of the configuration signal lines of the Loongson CPU to download the Loongson CPU BIOS. Set memory frequency and HT bus frequency appropriately to ensure proper function.

The debug method aforementioned resolves the compatibility issue between the Loongson CPU and the bridge chips' in the hardware layer and the protocol layer. The Loongson CPU can be directly linked to the southbridge chip or the northbridge chip without FPGA. Conclusion:

1. According to the present invention, northbridge chips that match with the Loongson CPU include RS780, RS780C, RS780D, RS780E, RS780G, RS780M, RS780MC, RX781, RS785G, RD790, SR5690, SR5670 and SR5650, and southbridge chips that match with the Loongson CPU include SB700, SB710, SB750, SB600, SP5100, SP5100R, and SP5100RS.

2. Pull down HT_8×2 signal, or in other words, set the HT bus which connects the Loongson CPU with the AMD northbridge to a 16-bit mode, as the Loongson CPU needs to match with the AMD northbridge in which the HT bus is 16 bits.

3. Disable these signals for high 8-bit HT bus (HT_HI_HOSTMODE, HT_HI_RSTn, HT_HI_POWEROK, HT_HI_LDT_REQn and HT_HI_LDT_STOPn) by pulling them on LOW level. Make these signals for low 8-bit HT bus (HT_LO_HOSTMODE, HT_LO_RSTn, T_LO_POWEROK, HT_LO_LDT_REQn, and HT_LO_LDT_STOPn) to control the 16-bit HT bus of the Loongson CPU, as the 16-bit HT bus is controlled as a whole when the Loongson CPU and the AMD northbridge are connected.

4. In the Loongson CPU operation with the AMD northbrige chip, the AMD bridge chip is the initiator of the HT protocol and works in master mode and the Loongson CPU works in a slave mode based on the motherboard's power up/down timing and sequence and the process of initialization. Therefore, HT_LO_HOSTMODE needs to be pulled on low level.

Figure 2:
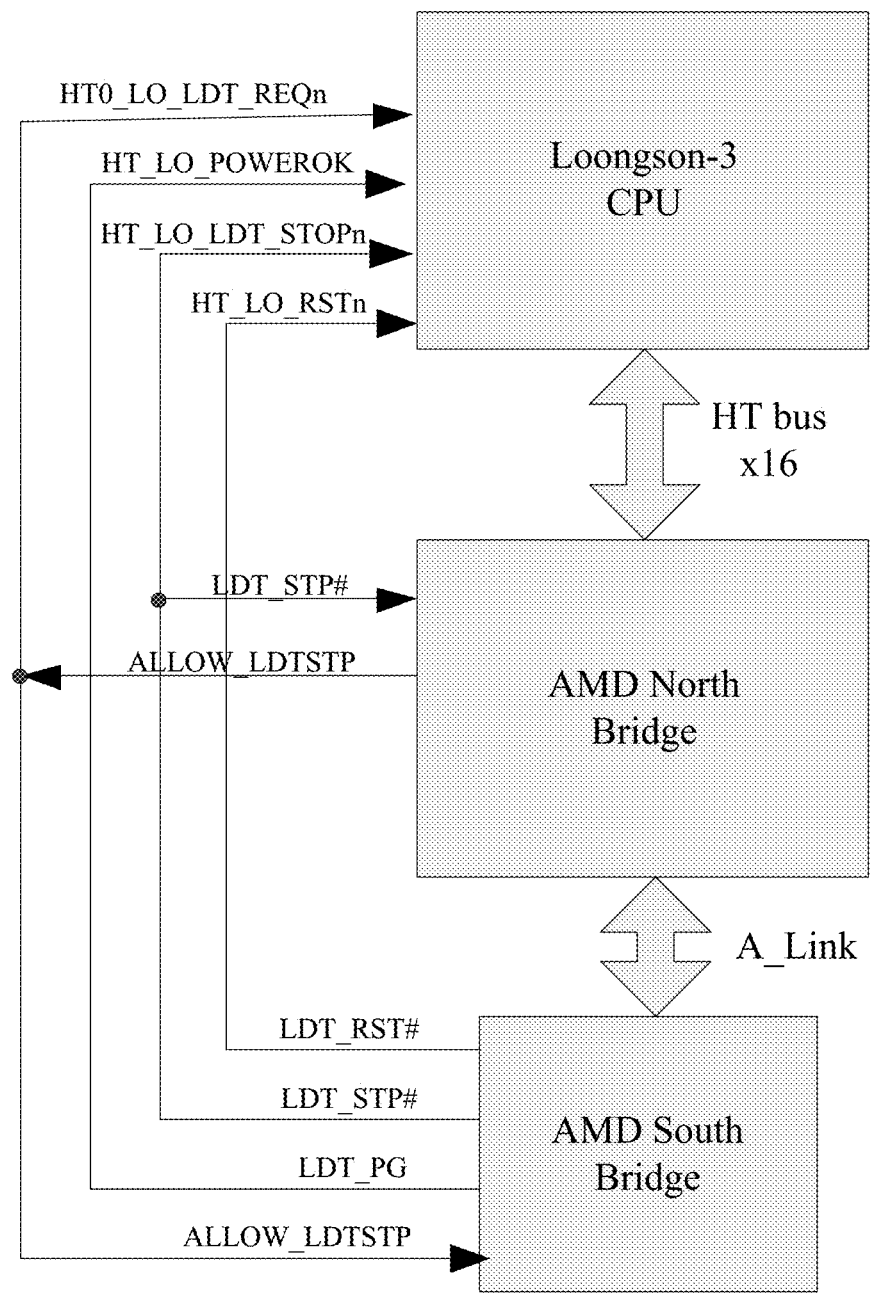
FIG. 2 is the Debug Device Provided by this Invention

5. As shown in FIG. 2, link the Loongson CPU to the AMD southbridge chip and northbridge chip through the low 8-bit HT bus signals of the Loongson CPU (HT_LO_POWEROK, HT_LO_RSTn, HT_LO_LDT_STOPn, HT_LO_LDT_REQn). In BIOS, the input and output attribute of HT_LO_POWEROK and HT_LO_RSTn signals are set to input.

The invention claimed is:

1. A method to debug the MIPS-structure CPU and bridge chips, comprising:
   choosing the northbridge chip and the southbridge chip to support the HT bus;
   linking pins on the MIPS-structure CPU, the northbridge chip and southbridge chip to a debug device;
   debugging pins on the MIPS-structure CPU to determine if there are any bugs; and
   connecting the corresponding pins of the MIPS-structure CPU to the pins of the northbridge/southbridge in the debug device and debugging the pins,
   wherein the debug device comprises:
   a FPGA chip;
   HT bus interfaces; and
   HT bus interface switches,
   wherein the debug device is linked to HT bus on the MIPS-structure CPU and the HT bus on the northbridge chip through the HT bus interfaces; and
   wherein the debug device is linked to southbridge chips through HT control lines and signal lines for power up/down timing and sequence.

2. A method of claim 1, wherein the debug device is configured to check if pin signals on the MIPS-structure CPU meet the requirements in User's Manual.

3. A method of claim 1, wherein if there are bugs on the pin signals of the MIPS-structure CPU, the problematic signals can be adjusted into standard signals with the help of the debug device.

4. A method of claim 1, wherein the debug device only opens one HT bus to enable one group of southbridge and northbridge to link with the MIPS-structure CPU, while the other HT buses are shut off.

5. A method of claim 1, wherein after the connecting one group of southbridge and northbridge with the MIPS-structure CPU, debug the HT bus to check if it is successfully connected; if the HT bus is successfully linked, continue to debug other pins; and if the HT bus is not linked, try another southbridge chip or northbridge chip.

6. A method of claim 1, wherein the MIPS-structure CPU employs an operating mode of a 16-bit HT bus.

7. A method of claim 1, wherein pins which are not clearly defined or fail to match any placements are introduced into the FPGA chip to debug and will be shielded or linked after the debugging.

8. A method of claim 1, wherein signals from the mentioned pins which are not clearly defined or fail to match any placements include power up/down timing signal signals and configuration signals.

9. A debug device for debugging a MIPS-structure CPU and south/north bridge chips, comprising:
- a FPGA chip;
- HT bus interfaces; and
- HT bus interface switches,
- wherein the debug device is linked to HT bus on the MIPS-structure CPU and the HT bus on the northbridge chip through the HT bus interfaces;
- wherein the debug device is linked to southbridge chips through HT control lines and signal lines for power up/down timing and sequence.

10. The debug device of claim 9, wherein the chips on the MIPS-structure CPU and the northbridge are directly introduced into the FPGA chip.

11. The debug device of claim 9, wherein the debug device can shape the signals when HT bus signals of the MIPS-structure CPU fail.

12. The debug device of claim 11, wherein the said signal shaping is achieved through programming in verilog language on the FPGA chip.

13. The debug device of claim 9, wherein only the HT buses and HT control lines on the MIPS-structure CPU, northbridge chip and southbridge chip, while the other HT buses on northbridge/southbridge are shut off.

14. The debug device of claim 13, wherein if the debugging of the southbridge or the northbridge fails, switch on the HT bus on the next southbridge or the next northbridge.

15. The debug device of claim 9, wherein pins which are not clearly defined or fail to match any placements are introduced into the FPGA chip to debug and will be shielded or linked after the debugging.

16. The debug device of claim 15, wherein signals from the said pins which are not clearly defined or fail to match any placements include power up/down timing signal signals and configuration signals.

17. The debug device of claim 9, wherein the debug device usually includes five HT interfaces, one for linking the MIPS-structure CPU and four for linking four northbridge chips.

\* \* \* \* \*